United States Patent
Ellig

(10) Patent No.: US 6,318,016 B1
(45) Date of Patent: Nov. 20, 2001

(54) LUMINOUS FISHING LURE

(76) Inventor: Michael Ellig, 1332 Bluebird La., Bozeman, MT (US) 59715

( * ) Notice: Subject to any disclaimer, the term of this patent is extended or adjusted under 35 U.S.C. 154(b) by 0 days.

(21) Appl. No.: 09/587,238

(22) Filed: Jun. 2, 2000

(51) Int. Cl.[7] ............................................. A01K 85/01
(52) U.S. Cl. ................................................... 43/17.6
(58) Field of Search ................................... 43/17.5, 17.6

(56) References Cited

U.S. PATENT DOCUMENTS

| | | |
|---|---|---|
| 3,690,028 | 9/1972 | Walker, Jr. . |
| 3,828,177 | 8/1974 | Day . |
| 4,227,331 | 10/1980 | Ursrey et al. . |
| 4,727,674 | 3/1988 | Garr . |
| 4,741,120 | 5/1988 | Cota et al. . |
| 4,799,327 | 1/1989 | Treon . |
| 4,819,361 | 4/1989 | Boharski . |
| 4,888,905 | 12/1989 | Garr . |
| 4,972,623 | 11/1990 | Delricco . |
| 5,063,700 | 11/1991 | Kiefer et al. . |
| 5,442,861 | 8/1995 | Lorocco . |

*Primary Examiner*—Kurt Rowan
(74) *Attorney, Agent, or Firm*—William B. Kircher; Shook, Hardy & Bacon LLP

(57) ABSTRACT

A fishing lure with a brightly luminous eye and partially luminous lateral line of a light collecting and transmitting optic fiber to imitate a bait fish. The lure includes a lure body wt. a fishing line connector and a hook. A pair of elongate, light storing and transmitting optical pipes are connected along each side the lure body. Each such light pipe has at least a partially exposed, light gathering length and each terminates in a bulbous lens. Light energy received in the light pipe generates a faint luminous glow along its length to represent the lateral line of a baitfish and generates a bright luminous glow at the bulbous lens to represent the eye of a baitfish.

10 Claims, 2 Drawing Sheets

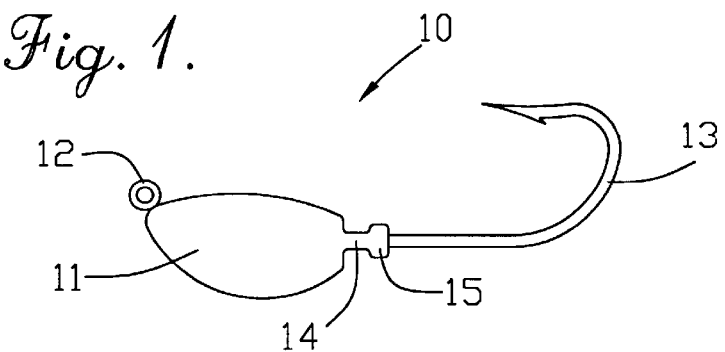
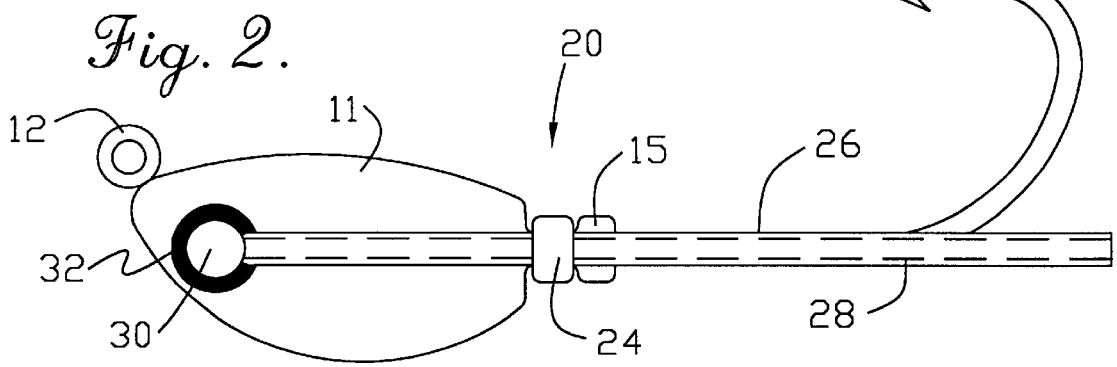
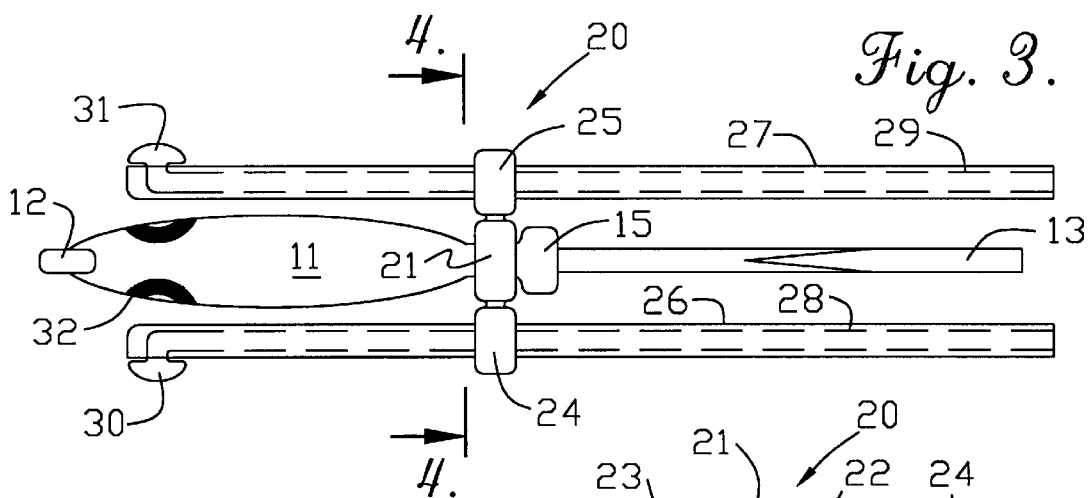

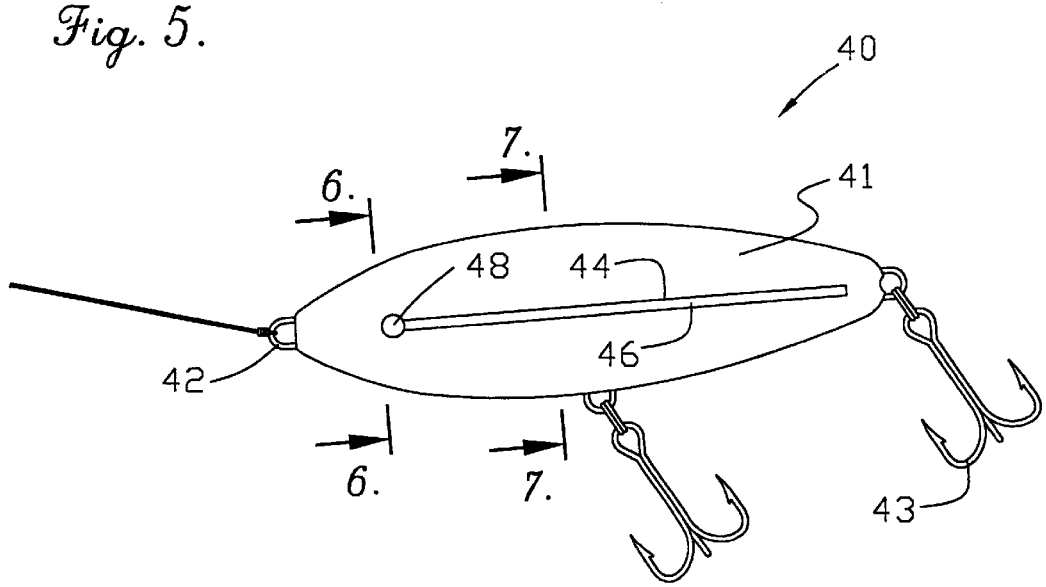
Fig. 5.
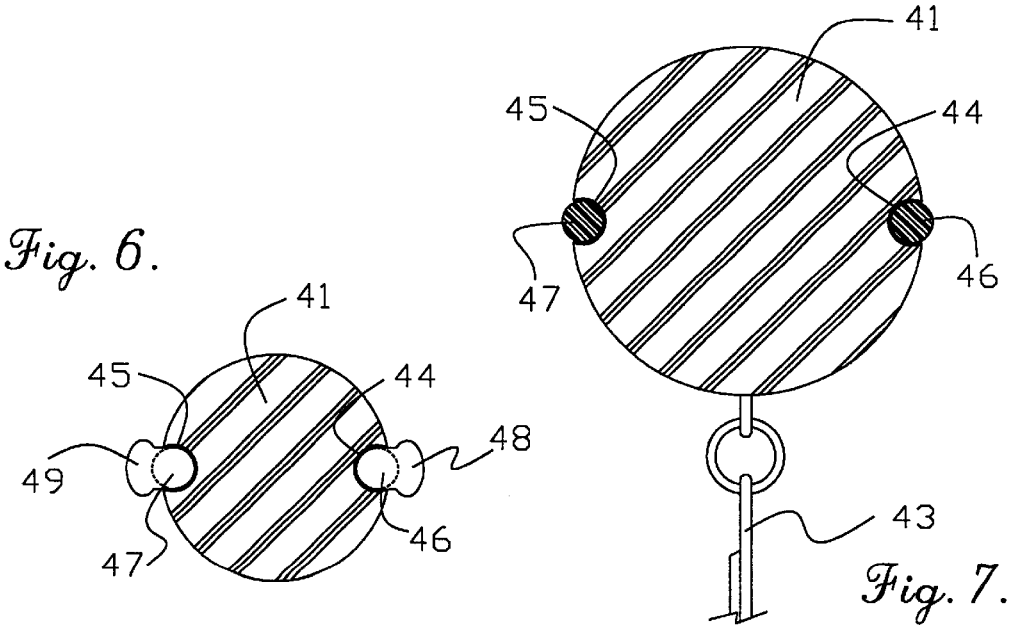
Fig. 6.
Fig. 7.

LUMINOUS FISHING LURE

BACKGROUND OF THE INVENTION

This invention relates to fishing lures to imitate baitfish. More specifically, the invention relates to a fishing lure with a brightly luminous eye and partially luminous lateral line of a light collecting and transmitting optic fiber.

In addition to the sensory organ known as the "lateral line" extending along each side of fish, it has long been recognized that predatory fishes frequently rely on sight as an aid to locate baitfishes. The eye of a baitfish is characteristically a prominent and large distinguishing feature. Relying on this fact, prior fishing lures designed to imitate baitfish have long included enhancement of the eye region with such features as enlarged molded eyes, contrasting painted eyes or various lighted eyes. These types of enhancements are thought to increase the ability of the fishing lure to attract and to promote a strike from a predatory fish.

Various types of lighted features have also been proposed for fishing lures to aid the fisherman in positioning or locating the lure during nighttime or other conditions of low natural light. Lighted fishing lures have traditionally employed some kind of energy source such as a battery or chemical light source. Approaches of this nature suffer from a variety of drawbacks. Obviously the fishing lure is used in a wet environment so malfunction of lures having an electrical system is common. Both battery powered and chemical powered features have a limited life, after which the energy source must be replaced. Accordingly, the maintenance, expense and reliability of fishing lures with a light feature have proven to be significant problems.

The need remains for fishing lure having luminous feature to aid in the imitation of baitfishes. The primary objective of this invention is to meet this need.

SUMMARY OF THE INVENTION

More specifically, an object of the invention is to provide a fishing lure having a luminous eye to provide a prominent feature as associated with bait fishes and which does not require to use of battery or chemical power.

Another object of the invention is to provide a fishing lure having a luminous line along the side thereof to imitate the lateral line of a baitfish.

An additional object of the invention is to provide apparatus to retrofit existing fishing lures in order create a lure having a luminous quality that does not require use of battery or chemical power.

Yet another object of the invention is to provide apparatus of the character described which can be readily adapted to change the perceived color of the luminous eye associated with the fishing lure.

A further object of the invention is to provide a fishing lure with a luminous eye, which is reliable in operation and easy to maintain without periodically recharging an energy source of the illumination.

In summary, therefore, an object of the invention is to provide a fishing lure with a brightly luminous eye and partially luminous lateral line of a light collecting and transmitting optic fiber to imitate a bait fish. The lure includes a lure body with a fishing line connector and a hook. A pair of elongate, light storing and transmitting optical pipes are connected along each side the lure body. Each such light pipe has at least a partially exposed, light gathering length and each terminates in a bulbous lens. Light energy received and collected the light pipe generates a faint luminous glow along its length to represent the lateral line of a baitfish and generates a bright luminous glow at the bulbous lens to represent the eye of a baitfish.

Other and further objects of the invention, together with the features of novelty appurtenant thereto, will appear in the course of the following description.

BRIEF DESCRIPTION OF THE DRAWINGS

In the accompanying drawings, which form a part of the specification and are to be read in conjunction therewith and in which like reference numerals are used to indicate like parts in the various views:

FIG. 1 is a side elevational view of a conventional jig head lure to be modified by a first preferred embodiment of the invention;

FIG. 2 is an enlarged, side view of a jig head lure similar to that of FIG. 1 fitted with a harness carrying fiber optic light pipes along adjacent sides of the lure illustrating a first preferred embodiment of the invention;

FIG. 3 is top plan view of the jig head lure illustrated in FIG. 2;

FIG. 4 is an enlarged, partially sectional view taken along line 4—4 of FIG. 3 in the direction of the arrows;

FIG. 5 is a side elevational view of a fishing lure illustrating a second preferred embodiment of the invention;

FIG. 6 is an end sectional view of the lure taken along line 6—6 of FIG. 5 in the direction of the arrows; and FIG. 7 is an end sectional view of the lure taken along line 7—7 of FIG. 5 in the direction of the arrows.

DETAILED DESCRIPTION OF THE DRAWINGS

Referring first to FIGS. 1–4 of the drawings in greater detail, there is illustrated apparatus constructed in accordance with this invention to modify or retrofit an existing fishing lure. FIG. 1 shows a conventional, prior art lure 10 commonly known to fishermen as a "jig" or "lead head jig". The lure 10 includes a molded head 11 to which is secured a fishing line connector 12 and a hook 13. The molded head 11 of a lure of this genre characteristically includes a neck 14 and a shoulder 15 to receive a flexible skirt (not shown). As the lure 10 is pulled through the water, the flexible skirt trails behind the head 11 to flutter and wiggle for the purpose of attracting predator fish. Instead of a flexible skirt, or as an added feature, another common technique used by fishermen is to place a piece of pork rind or similar flexible strip over the bight of the hook 13 as an attraction feature.

One embodiment of accessory equipment of this invention to modify a fishing jig 10 is shown in FIGS. 2–4 where additional attractor features such a jig skirt or pork rind strip have been removed to better illustrate the details of construction. Such features could, of course, be later added as desired by the fisherman. Disposed on the lure neck 14, behind the head 11, is a yoke 20 of resiliently deformable material. As best shown in FIGS. 3 & 4, the yoke 20 includes a central donut 21 joined by interconnecting webs 22 & 23 to side donuts 24 & 25. The central donut 21 may be slipped over the hook 13 and stretched over the shoulder 15 to encircle the neck 14. The side donuts 24 & 25 are oriented to extend along opposite side of the lure 10 as shown in FIG. 3.

Received for a friction fit with each side donut 24 & 25 are corresponding conduits 26 & 27. The conduits 26 & 27 securely carry fiber optics 28 & 29. At the forwardmost end thereof, each fiber optic 28 & 29 lies adjacent the forward end of the jig head 11 and extends beyond the end of its associated conduit 26 & 27. The exposed ends of the fiber optics 28 & 29 are bent at a substantial angle away from the lure head 11 and formed as a bulbous lens 30 & 31.

Fiber optics 28 & 29 comprise a preselected length of a fluorescent dye polymer having a diameter that typically varies from 0.020 to 0.080 inches. It is of a composition characterized as light gathering along its length to conduct and focus gathered light at the lens 30 & 31. Such fibers are available from commercial sources such as Optectron Inc. of Raynham Mass. under the trademark "Plastifo" and may be of a type disclosed, for example, in U.S. Pat. No. 5,121,462 incorporated herein by reference.

Fiber optic elements of this type are commonly identified as scintillating optical fibers and/or wave length shifters and typically, comprise a polymer base such as a polystyrene core to which a fluorescent dopant has been added along with a fluoropolymer cladding. The dopant is chosen so as to cause fiber light absorption over a specific wave length that is transformed into a longer wave length that is re-emitted in amplified form at the extremities of the fiber. The thin cladding is of a lower refractive index than the fiber for improving light transmission along its length and to focus the light to an astounding brightness at its distal end that in accordance therewith, may include lens 30 & 31. The lens 30 & 31 is fabricated by application of heat which mushrooms the fiber end producing a thickened convex lens.

As shown in the views of FIGS. 3 & 4, the conduits 26 & 27 completely encase the length of the fiber optics 28 & 29 for protection and rigidity. In order for the length of fiber optics 28 & 29 to receive light energy from a natural or artificial light source, it is therefore necessary that the conduits 26 & 27 be fabricated of a transparent or semi-transparent material through which light can be freely transmitted. The outside diameter of the conduits 26 & 27 is substantially equal to, or slightly more than, the inside diameter of the side donuts 24 & 25 of the yoke 20.

Alternatively, the conduits 26 & 27 may be constructed as a fiber optic holder from a shaft having a longitudinally extending slot or channel cut lengthwise therein. The channel can receive the light gathering fiber optic elements by using a friction fit, gluing, or other means of bonding the fiber optic into the channel of the holder. The fiber optic supported by a holder of such configuration may be exposed to natural or artificial light through the shaft of the holder if constructed of transparent material and also through the channel itself in which the fiber optic resides.

In order to increase the contrast of the luminous lens 30 & 31 with the lure head 11, the lure head 11 may be painted a contrasting color or, as illustrated in FIGS. 2 & 3, may include a darkened iris region 32. Alternatively, a portion of the conduit or holder 27 & 28 adjacent the distal ends 30 & 31 of the fiber optics have include a blackened or dark coating to provide a sharp contrast for the fiber optic eyes of the lure. Such portion of the conduit or holder 27 & 28 has the added advantage of protecting the fiber optic from being snagged and broken.

A plug style fishing lure 40 constructed in accordance with a second embodiment of the invention is illustrated in FIGS. 5–7. Lure 40 includes a molded or carved lure body 41 to which is secured a fishing line connector 42 and one or more hooks 43.

The lure 40 includes longitudinal grooves 44 & 45 running along opposite sides of the lure body 41 to substantially mimic the lateral line organ of a bait fish intended to be represented by the lure 40. Received within the longitudinal grooves 44 & 45 are fiber optics 46 & 47. The fiber optics 46 & 47 may be installed as a snap fit into the grooves 44 & 45 or may be glued. It is important to note that a portion of the fiber optic 46 & 47 along substantially the entire length of each such fiber optic is exposed to receive energy from a natural or artificial light source.

Each fiber optic 46 & 47 includes a terminal end bent outwardly from its associated groove 44 & 45 and formed as a bulbous lens 48 & 49.

So constructed, the length of the fiber optic along each side of a fishing lure constructed in accordance with the principles of this invention may be exposed to a natural or artificial light. The light energy is transmitted along the fiber optic to create a brightly luminous eye at the lens of each fiber optic and partially luminous line along the length of the fiber optic itself. Thus, the lure imitates a baitfish to a predator by providing a prominent, highly luminous eye feature and a less luminous lateral line feature.

From the foregoing it will be seen that this invention is one well adapted to attain all end and objects herein above set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A fishing lure to imitate bait fish, said lure comprising:
   a lure body;
   a fishing line connector securely attached to said lure body;
   a hook member securely connected to said lure body; and
   first and second light transmitting optical pipes connected to opposite side of said lure body, each said optical pipe having an outwardly extended, bulbous end portion to imitate the eye of a natural bait fish, and further having at least a partially exposed, elongate portion integrally joined to said bulbous end to extend longitudinally along the side of said lure body to imitate the lateral line of a natural bait fish;
   whereby said elongate portion of said light pipe receives light energy to generate a luminous glow along said elongate portion and a brightly luminous glow at said bulbous end portion.

2. The lure as in claim 1, further including a harness member connecting said light pipes to opposite side of said lure body.

3. The lure as in claim 2, said harness having a lure body engaging portion and a pair of spaced apart light pipe holding portions connected to said lure body engaging portion.

4. The lure as in claim 1, each said optical pipe comprising (1) a fiber optic member having a terminal end lens and a preselected length; and (2) a fiber optic holder formed of at least partially transparent material to protect said fiber optic member along the length thereof.

5. The lure as in claim 4, said fiber optic member being fabricated from a fluorescent dye polymer.

6. The lure as in claim 1, said lure body including longitudinal channels along the sides thereof which receive said elongate portions of said light pipes.

7. Apparatus to adapt a fishing lure with a lure body, a fishing line connector and a hook to imitate a bait fish, said apparatus comprising:

a harness member connected to said lure body;

first and second light transmitting optical pipes connected to said harness member on opposite sides of said lure body, each said optical pipe having an outwardly extended, bulbous end portion to imitate the eye of a natural bait fish, and further having at least a partially exposed, elongate portion integrally joined to said bulbous end to extend longitudinally along the side of said lure body to imitate the lateral line of a natural bait fish;

whereby said elongate portion of said light pipe receives light energy to generate a luminous glow along said elongate portion and a brightly luminous glow at said bulbous end portion.

8. The lure as in claim 7, said harness having a lure body engaging portion and a pair of spaced apart light pipe holding portions connected to said lure body engaging portion.

9. The lure as in claim 7, each said optical pipe comprising (1) a plastic fiber optic member having an terminal end lens and a preselected length; and (2) a conduit formed of at least partially transparent material to protectively encase said fiber optic member along the length thereof.

10. The lure as in claim 9, said fiber optic member being fabricated from a fluorescent dye polymer.

* * * * *